United States Patent [19]

Benecke et al.

[11] Patent Number: 6,149,789

[45] Date of Patent: Nov. 21, 2000

[54] PROCESS FOR MANIPULATING MICROSCOPIC, DIELECTRIC PARTICLES AND A DEVICE THEREFOR

[75] Inventors: Wolfgang Benecke; Bernd Wagner; Günter Fuhr; Rolf Hagedorn; Thorsten Müller, all of Berlin, Germany

[73] Assignee: Fraunhofer Gesellschaft zur Forderung der angewandten Forschung e.v., Germany

[21] Appl. No.: 08/508,079

[22] Filed: Jul. 27, 1995

Related U.S. Application Data

[63] Continuation-in-part of application No. 08/050,045, Jun. 1, 1993, abandoned.

[30] Foreign Application Priority Data

Oct. 31, 1990 [DE] Germany .............................. 40 34 697

[51] Int. Cl.[7] .......................... G01N 27/26; G01N 27/447
[52] U.S. Cl. ............................................. 204/547; 204/643
[58] Field of Search .................................... 204/547, 643; 209/1, 127.1, 128, 130, 127.4

[56] References Cited

U.S. PATENT DOCUMENTS 4,569,741  2/1986  Pohl ........................................ 204/547

FOREIGN PATENT DOCUMENTS 3325843  2/1985  Germany .
9207657  5/1992  WIPO .

OTHER PUBLICATIONS

Senichi Masuda et al "Movement of Blood Cells in Liquid by Nonuniform Traveling Field" IEEE Transactions on Industrial Applications. vol. 24, No. 2 (Mar./Apr. 1988) 217–222.

Senichi Masuda et al "Separation of small particles suspended in liquid by non–uniform travelling field produced by three phase electric curtain device" presented at 1955 IEEE–IAS Anu. Meeting, Toronto, ON, Canada, Oct. 6–11.
Masuda et al., "Movement of Blood Cells in Liquid by Nonuniform Traveling Field", IEEE Transactions in Industry Applications, vol. 24, No. 2, pp. 217–222, Mar./Apr. 1988.
Masuda et al., "Separation of Small Particles Suspended in Liquid by Non–Uniform Traveling Field Produced by Three Phase Electric Curtain Device", presented at 1985 IEEE–IAS Ann. Meeting, Toronto Ontario, Canada, Oct. 6–11.
Fuhr et al., "Radio–Frequency Microtools for Particle and Live Cell Manipulation", Naturwissenschaften 81, pp. 528–535, 1994.

*Primary Examiner*—William H. Beisner
*Assistant Examiner*—John S. Starsiak, Jr.
*Attorney, Agent, or Firm*—Antonelli, Terry, Stout & Kraus, LLP

[57] ABSTRACT

Disclosed is a process for manipulating microscopic dielectric particles in which particles are exposed to an electric field. In disadvantaged processes the particles are exposed to inhomogeneous electric field and are polarized by them. The polarized particles are moved in the direction of higher field strength. These processes permit no reversal of the traveling direction of the particles. The particles are enriched at the electrode so that they cannot be retained in free space. In the invented process the particles are exposed to high-frequency field traveling in one or more prescribed direction, by which the particles are subject to a force which sets them in a motion that is strongly synchronous to the field. With the aid of a device for carrying out the invented process, the particles can be manipulated very flexibly. By means of linearly or circularly disposed electrodes, the particles can be moved on linear paths in any direction including through branched microstructures, they can be separated according to their dielectric properties and retained without contact. Applications are in the fields of biotechnology and molecular separation, focussing and microtransport technology.

20 Claims, 15 Drawing Sheets

FIG. 4

| t4 | t3 | t2 | t1 |  |  | t1 | t2 | t3 | t4 |
|----|----|----|----|---|---|----|----|----|----|
| −  | −  | +  | +  | el. 12 |  | −  | −  | +  | +  |
| +  | −  | −  | +  | el. 11 |  | −  | +  | +  | −  |
| +  | +  | −  | −  | el. 10 |  | +  | +  | −  | −  |
| −  | +  | +  | −  | el. 9  |  | +  | −  | −  | +  |
| −  | −  | +  | +  | el. 8  |  | −  | −  | +  | +  |
| +  | −  | −  | +  | el. 7  |  | −  | +  | +  | −  |
| +  | +  | −  | −  | el. 6  |  | +  | +  | −  | −  |
| −  | +  | +  | −  | el. 5  |  | +  | −  | −  | +  |
| −  | −  | +  | +  | el. 4  |  | −  | −  | +  | +  |
| +  | −  | −  | +  | el. 3  |  | −  | +  | +  | −  |
| +  | +  | −  | −  | el. 2  |  | +  | +  | −  | −  |
| −  | +  | +  | −  | el. 1  |  | +  | −  | −  | +  |

PROCESS FOR MANIPULATING MICROSCOPIC, DIELECTRIC PARTICLES AND A DEVICE THEREFOR

CROSS-REFERENCE TO RELATED APPLICATION

This application is a continuation-in-part application of Ser. No. 08/050,045, filed Jun. 1, 1993, now abandoned.

BACKGROUND OF THE INVENTION

1. Technical Field

The present invention is related to a process for manipulating microscopic, dielectric particles as well as a device therefor.

In order to examine microscopic particles, such as biological cells, synthetic particles or large molecules, such as proteins, these particles need to be separated, moved at the site of examination, focussed and retained there. The particles need to be moved singlely or in groups in prescribed different directions.

For three-dimensional microscopy and for spectroscopic procedures, the particles have to be maintained in defined positions without contact while simultaneously maintaining manipulatability, i.e., by way of illustration, rotation about defined angles and axes.

Focussing should occur, depending on the case of application, in a point-shaped, linear or areal manner.

2. State of the Art

A known process for manipulating small dielectric particles is dielectrophoresis. In this way, the particles are subject to an inhomogeneous, electric field which polarizes the particles unsymmetrically. The particles are moved in the direction of the higher, resp. lower field strength and collect at the respective electrode. Mixtures of different types of particles can be separated with alternating electric fields.

Restrictions in the utilization of this known process result from the particles always being moved, independent of the direction of the field, to the site of high, resp. low field strength. With a prescribed configuration, movement of particles is thus only possible in one direction. There is a concentration of particles at the electrode so that the particles cannot be retained in free space.

In the state of the art processes, the electric field usually has curved field lines. As the particles move along the field lines, straight transport over longer stretches, by way of illustration, in channels of microstructures, is not possible.

In a process from a different generic type, notably a process for differentiating particles in a medium, there is already known from DE 33 25 843 C2, to suspend the particles in a fluid and expose them to a changing electric field. Of particular interest, the teaching of the DE 33 25 843 C2 FIG. 1 concerning a generator/amplifier arrangement for generating a commonly known plurality of alternating voltages having differing phases, is applicable for use as a generator/amplifier with the present invention. The application of this process for manipulating microscopic, dielectric particles has, however, hitherto not been considered.

DESCRIPTION OF THE INVENTION

The object of the present invention is to provide a process for manipulating microscopic, dielectric particles with which the particles can be manipulated especially flexibly. Furthermore, the object of the present invention is to provide a device for carrying out the process.

This object is solved in generic processes by the characterizing features of a generic embodiment (e.g., FIGS. 1 and 14); which is disclosed ahead. Moreover, this object is solved by the characterizing features of a more particularized embodiment (e.g., FIG. 3), which is also disclosed ahead.

A high-frequency traveling field exercises repulsion and attraction forces on the particles suspended in a fluid of little conductivity, which are determined by the fact that the interfacial charges induced in the particles by the electric field remain behind the traveling field vector.

This permits uniform movement of the particles, which runs strongly asynchronously to the electric field with the direction of movement and the velocity of the particles depending on their dielectric properties and the field movement.

The movement of the particles can be made very flexible by means of traveling fields with uniform, alternating or multiple traveling frequencies. The particles can be retained in an electrode-free space without contact.

Animal or higher-plant cells tolerate reduced-electrolyte media only for short periods and normally require balanced media, containing large amounts of salts, amino acids, and proteins. The conductivity of physiological media is several orders of magnitude higher than that of most electromanipulation media (usually 1,4 S/m compared to 0,05 S/m or less). Due to these factors, biological and medical applications of electrical fields have largely been restricted to measurement techniques, with fields that are far too weak to allow electromanipulation.

The most important aspect for the use of electric fields for moving and collecting cells is that of direct electronic control, with millisecond or microsecond response times dictated by the inertia of the microscopic particles themselves. Feedback from position sensors 5 (impedance, optoelectronic, or ultrasonic; see, e.g. FIG. 15) would allow fully automated systems to be built. The ability to shape the field allows work either with single cells or with aggregates. It has been recognized that field frequencies of 100 kHz or less should be avoided because of the induction of transmembrane potentials large enough to damage the cell.

Inhomogeneous fields either attract cells into a highfield region (positive dielectrophoresis), or else repel them from it (negative dielectrophoresis), depending upon the frequency and the passive electric properties of the system. The cells need to be protected from the extremely high fields and other damaging effects at electrode surfaces. Thus negative dielectrophoresis is advantageous. In the poorly conducting media only positive dielectrophoresis occurs over most of the accessible frequency range which is between the upper kHz to MHz.

Improvements to electric-field techniques can be realized by miniaturization combined with the insulation of unnecessary electrode surfaces. The result is a drastic reduction in the temperature rise and this permits the use of physiological media. In turn, such media give negative dielectrophoresis at frequencies that induce an insignificant transmembrane potential.

Further embodiments and developments of the present invention are set forth in additional discussion ahead.

According to a filed inhomogeneities embodiment, the particles following the traveling field are, in addition, conducted electrically over field inhomogeneities. This is attained by superimposing static fields or alternating inhomogeous fields over the traveling field. The transport channel for the particles can be limited by this means to a narrow region. The invented process is especially advantageous if transport of particles is to occur via microstructures.

Narrowing of the transport channel can be attained according to a boundary embodiment (e.g., FIG. 3) by mechanical boundaries MB (FIG. 6) such as grooves or walls within which preferred special paths are created for the particles.

Typical values for the traveling frequency of the electric fields and for the applied voltage for good results are set forth ahead (e.g., claim 4). In this manner, in the case of a particle average of several 10 micrometers, particle velocities up to several millimeters a second can be attained.

An invented device for carrying out this process is described in a multi-electrode embodiment (e.g., FIG. 3). A multi-electrode system is disposed on a base. Single electrodes of this system are disposed almost perpendicular to the propagation direction of the traveling fields. The expansion (i.e., width) of the electrodes in the direction of the traveling fields is of the same magnitude as that of the particles to be manipulated (e.g., see FIG. 5). The intervals between the electrodes are also of the same magnitude.

With the aid of an electronic circuit, the electrodes are triggered with high-frequency traveling fields with uniform, alternating or multiple traveling frequencies. By this means the particles are either set in motion in the spaces bordered by the electrodes or set into motion above the electrodes.

A special high degree of flexibility of the particles movement is attained with a device according to a branching embodiment (e.g., FIG. 6). The branching described therein permits deflection of the particles in a selectable direction and, therefore, represents a switch for the particle stream.

According to a rectangularly-shaped embodiment (e.g., FIG. 1), the electrodes are rectangular in shape with the longitudinal sides being several times longer than the tangential sides. The electrodes are disposed at the same intervals in such a manner that the longitudinal axes are parallel and the direction of the traveling field runs perpendicular to the longitudinal axes. In this embodiment, the movement of the particles occurs above the electrodes perpendicular to the longitudinal axes of the electrodes. It is particularly suited for separation of particles according to their traveling properties which are influenced by the passive electric properties and the size of the particles.

A further embodiment of the invented device is described with respect to a V-shaped notch arrangement as illustrated with respect to FIG. 2. The electrodes are interrupted in a V shaped area extending from the center in such a manner that the remaining parts of the electrodes respectively represent a separate path for the traveling field, resp. for the particles in different directions. In this manner a particle switch is realized with which the particle movement occurs over the electrode surfaces.

In the case of the electrode arrangement illustrated, for example, in two rows of electrodes enclose an electrode-free channel running in the direction of the traveling field. The moved particles can either center in the middle of the channel or be moved along the wall formed by the electrodes.

This arrangement, too, can be further developed according to FIG. 6 which is directed to a particle switch by disposing the electrodes in such a manner that they are staggered increasingly in an outward direction. Additional electrodes are disposed in the area of the electrode-free channel widened in such a manner that the channel branches.

With a device according to FIG. 7, in which two pairs of rows of electrodes standing perpendicular to each other are disposed about a channel which runs in the direction of the traveling field, the particles can be moved, collected and retained in the free space of the fluid medium.

An advantageous further development of the present invention is described in FIG. 9. The electrodes form closed circular, ring-shaped paths, which are disposed at the same intervals about a center. A depression, an opening in the carrier material, or a rise can be formed in this center. With this device, particles can be conveyed over the electrodes, depending on the traveling direction of the high frequency field, toward the center or toward the periphery.

If the electrode rings are divided into sections according to FIG. 8, the particles are moved in the resulting electrode-free channels. The particles can be conducted out of various quadrants of the electrode-ring system toward the center and conveyed from there in a desired direction. With this device, a particularly flexible micromanipulator for manipulating microscopic particles is made available which is particularly suited for working with living, biological cells.

According to FIG. 9, many electrode systems are disposed on a base plate which is designed as a thin membrane. The thin membrane is perforated in the area of these systems so that the particles can stream through these openings. The particles, however, can only pass if they are conveyed by means of the traveling high frequency fields in direction of the centers. In this way, the device represents a controllable semi-permeable membrane.

In the device according to FIG. 10, hereto, the electrodes are formed as elliptic paths which are disposed about a mutual focal point. This device is suited for centering and decentering particles, with the decentering occurring not axially symmetrically but rather increasingly in the preferred directions.

An invented device for focussing and separating particles in a circular chamber is described for example, in FIGS. 11e and 11f. At least four electrodes are disposed in a ring about a circular chamber. The particles are collected in the center of the chamber or accumulated at the electrode surfaces, depending on their dielectric properties, by means of a circular running field generated with the aid of the electrodes.

Further developments of an invented device are set forth in surface textured embodiments, by which the traveling properties of the particles are influenced. Altering the surface structure of the base and the electrodes changes the gliding, resp. rolling friction forces exercised by the base on the particles. These measures are used advantageously in the separation of different types of particles. An isolation layer of the electrodes (FIG. 6A), which is of varying thickness at local points, results in the electric field having a varyingly strong effect on the particles at different points. In this manner, preferred paths are created for the particles. Depressions, resp. elevations in the area of the electrode-free channels result in the particles there gathering more strongly or in less concentration.

According to a further particularized surface texturized embodiment (FIG. 6A), the depressions and elevations are generated in the area of the channels preferably with the aid of etching processes. By employing materials customarily used in microstructure technology for the fabrication of the base, the process steps applied there can be utilized advantageously. As the expansion of the electrodes in the direction of the traveling field is comparable to the size of the particles to be manipulated, the electrodes are preferably molded structurally and galvanically using photolithographic methods. The thickness of the electrodes can reach between several μm to several hundred μm. With this method, the height of electrodes arranged in series can be quite easily increased successively, thus permitting movement of particles out of the surface. As the electrodes are subject to suspensions, chemically inert materials are preferably employed in their fabrication. Effective protection of the electrodes against outside influences is attained by covering them with a coating of insulation.

An especially advantageous further development of an invented device consists, according to the FIGS. 14, 15, and 17 embodiments, of the integration of the multi-electrode system on a mutual base in conjunction with the circuit to generate the electric traveling fields and to evaluate the particle movement.

According to a sealed embodiment (FIG. 16), the invented device can be sealed in capsules. For this purpose, a cover plate made of a material customary in microstructure technology is connected to the base plate, by way of illustration, by means of adhesive technology or by means of anode bonding. This plate may also be provided with electrodes and/or troughs and channels T (FIG. 16).

According to the advantageous further development according to an interconnected or cascaded embodiment (FIG. 17), several bases having electrode systems are connected to each other. By this means, cascades of electrodes are created and elongated channels or spaces are created, in which the particles are stored, separated, concentrated or transported.

The advantages attained with the present invention consist, in particular, of an especially flexible manipulation of microscopic, dielectric particles in the micrometer range. The particles can be moved without contact through narrow channels on straight paths, they can be brought through particle switches at various destinations and retained there without contact for tests. The particles can be focussed or defoccussed and sorted according to their dielectric properties.

In a multi-electrode system, various arrangements for linear transport, for focussing, for retention including branches can be joined in such a manner that complex particle movement procedures can be realized, thus making manipulation of particles in microstructures possible.

The invented process and the invented device are suited for utilization in biotechnology, in the fields of molecular separation, focussing and microtransport technology. They are also suited for manipulation of both synthetic particles and living cells.

BRIEF DESCRIPTION OF THE DRAWINGS

The embodiments of the present invention are schematically represented in the drawings and made more apparent in the following section without the intention of limiting the scope or spirit of the overall inventive concept.

FIG. 4 illustrates a triggering of the electrodes of an invented device at four consecutive periods.

DESCRIPTION OF PREFERRED EMBODIMENTS

Figure 1:
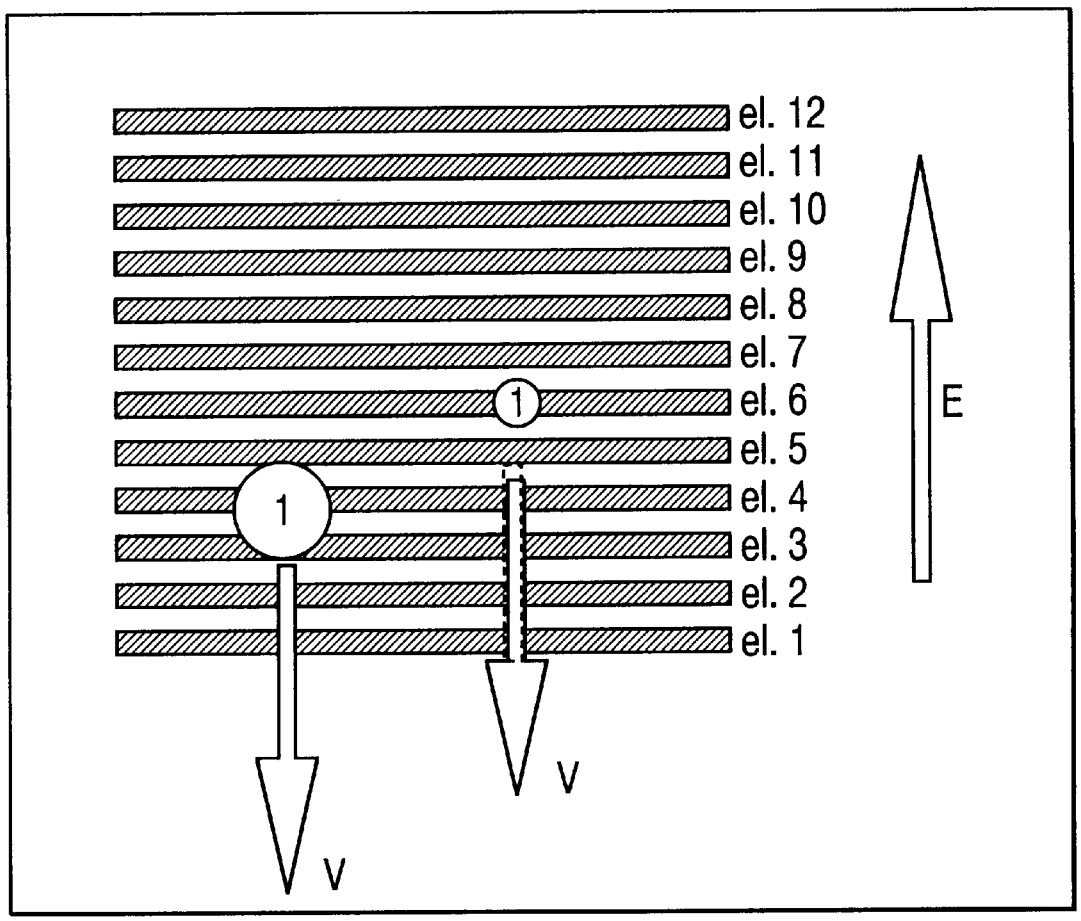
FIG. 1 illustrates a device for linear movement of particles above electrodes.

FIG. 1 shows an arrangement of 12 elongated electrodes el.1 to el.12, which are disposed one after the other in such a manner that their longitudinal axes are parallel to each other. The arrow E indicates the traveling direction of the field strength vector. The movement of particles 1 occurs via the electrodes el. 1 to el. 12 perpendicular to their longitudinal axes in direction of the arrows V.

The electrodes have a length of several hundred micrometers and a width of approximately 10 micrometers and are spaced approximately 10 micrometers apart. With an electrode voltage of 10 volts and a traveling frequency of 0.2 to approximately 10 megahertz, particle velocities of several millimeters per second are measured with the particles having diameters of 20 to 70 micrometers. The particle movement occurs strongly asynchronously to the traveling field, approximately $10^{-2}$ to $10^{-7}$ times slower.

Figure 2:
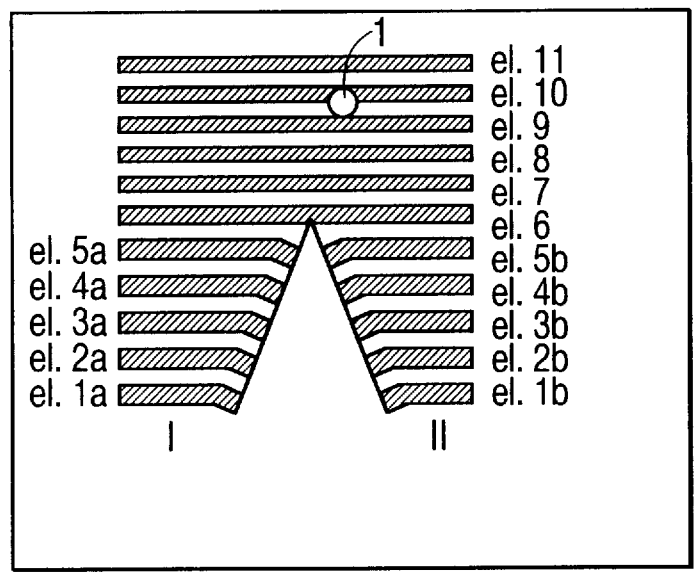
FIG. 2 illustrates a particle switch for branched movement above electrodes.

FIG. 2 shows a particle switch in which the particles travel above the surfaces of the electrodes like in the previously preferred embodiment. The first five electrodes are interrupted in the center region in such a manner that a row of electrodes I with electrodes el.1a to el.5a and a row of electrodes II with electrodes el.1b and el.5b. are created.

A particle 1 which is moving toward the electrode branching is led above the electrode row I or the electrode row II depending on whether voltage is applied to the electrodes el.1a to el.5a or to the electrodes el.1b to el.5b.

Figure 3:
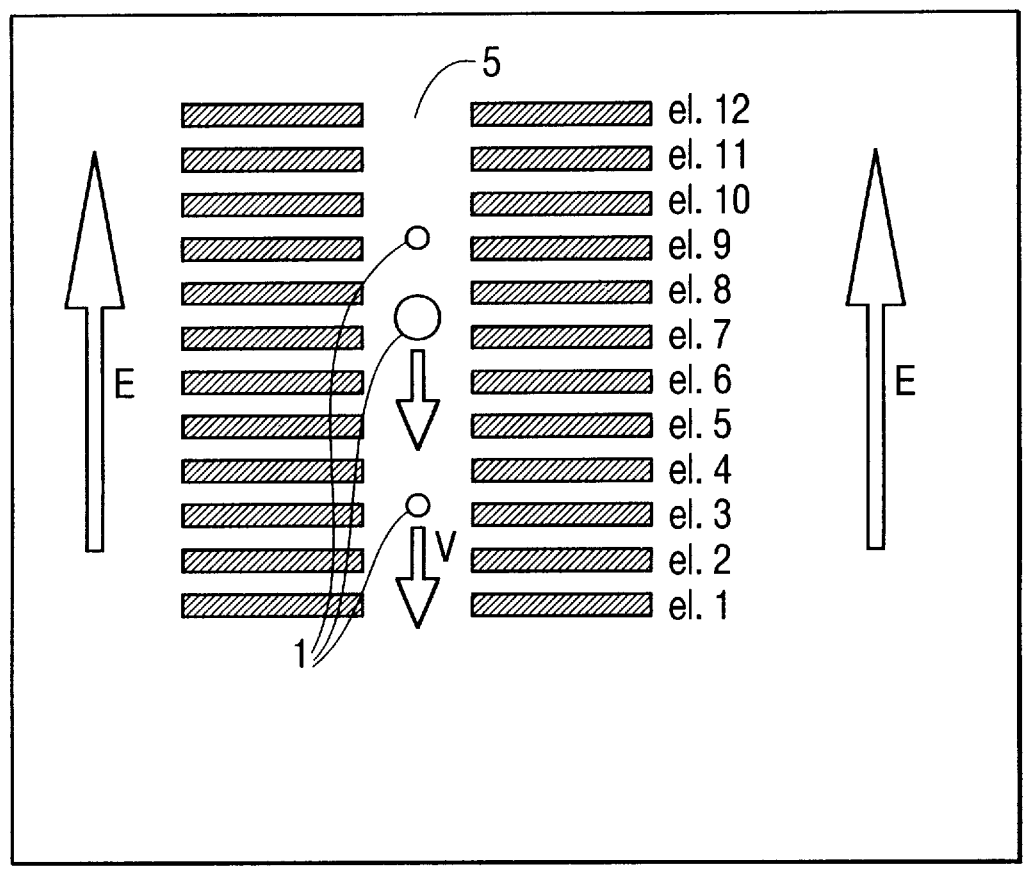
FIG. 3 illustrates a device for linear movement of particles in an electrode-free space.

The device shown in FIG. 3 is provided with two rows of electrodes el.1 to el.12 bordering a channel 5. The particles 1 are moved in the electrode-free space of channel 5 in the direction of arrows V by means of the field traveling in direction of arrow E. The electric triggering of the electrodes el.1 to el.12 is shown in FIG. 4, with the signs of the voltages applied to the electrodes at the four successive periods t1 to t4 being given.

Figure 5:
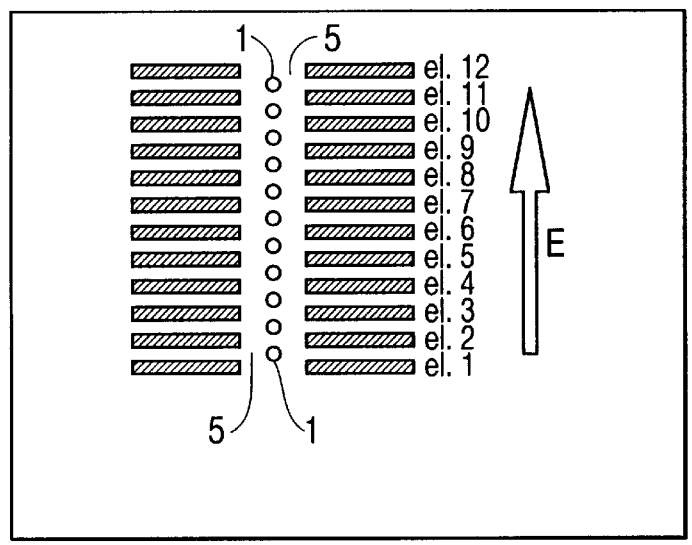
FIG. 5 illustrates a device for focussing particles in an electrode-free space.

FIG. 5 shows that the afore-described device is also suited for focussing. A dispersion of approximately 5% dextran-water beads having a diameter of less than one micrometer are added to 50% n-propanol in the channel 5. By applying a traveling field E of 1 to 15V and a frequency of 800 kilohertz at both electrode rows, the dextranwater beads are moved between the electrodes and are respectively concentrated in the center of two pairs of opposite electrodes so that they fuse to distinctly visible drops 1. The visible drops 1 are retained in the shown positions.

Figure 6:
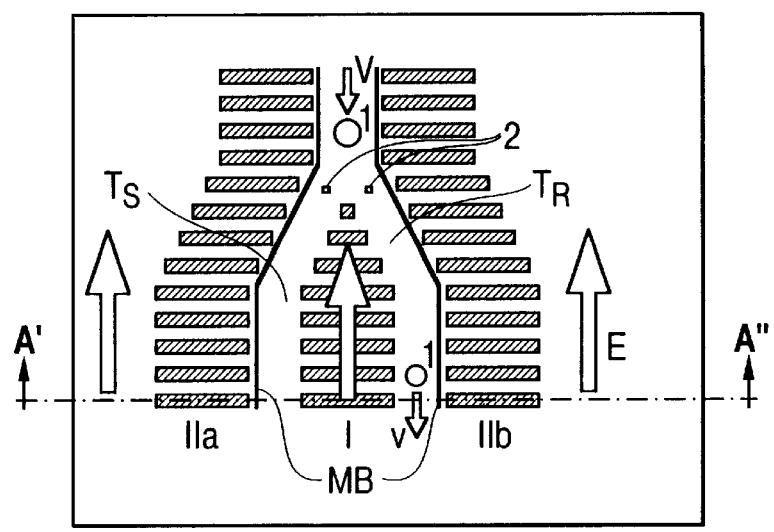
FIG. 6 illustrates a particle switch for branched movement in an electrode-free space.

FIG. 6 shows a device having an arrangement of electrodes, which permits a branching movement of the particles in electrode-free space. The electrodes of both electrode rows IIa and IIb are arranged increasing staggered in the center region so that the result is a wide channel. Another electrode row I is disposed in this channel, wherein the channels can be bordered by mechanical boundaries MB. The length of the electrodes of row I increases corresponding to the staggering of the outer row of electrodes so that the result are two channels of constant width joining to one channel. In addition, point-shaped electrodes 2 are disposed at the branching site. Depending on whether the traveling field is generated by the electrode row I and IIa or I and IIb, the particles are led through the respective channel. The traveling direction of the particles may also be determined by triggering one or the other of the supplementary electrode 2.

Figure 6A:
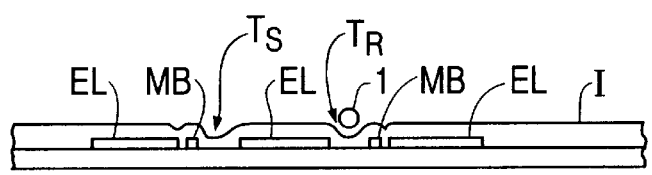
FIG. 6A illustrates a cross-sectional view of the FIG. 6 particle switch.

FIG. 6A is a cross-sectional view taken along line A'-A" of FIG. 6, and illustrates an insulator layer I disposed over the electrodes EL and mechanical boundaries MB so as to form troughs, waves (e.g., $T_S$, $T_R$) and regions of varying strength. Any of the troughs, waves or elevations can be appropriately treated (e.g., via etching) so as to result in regions of varying roughnesses, e.g., $T_S$ can represent a smooth trough and $T_R$ can represent a rough trough.

Figure 7:
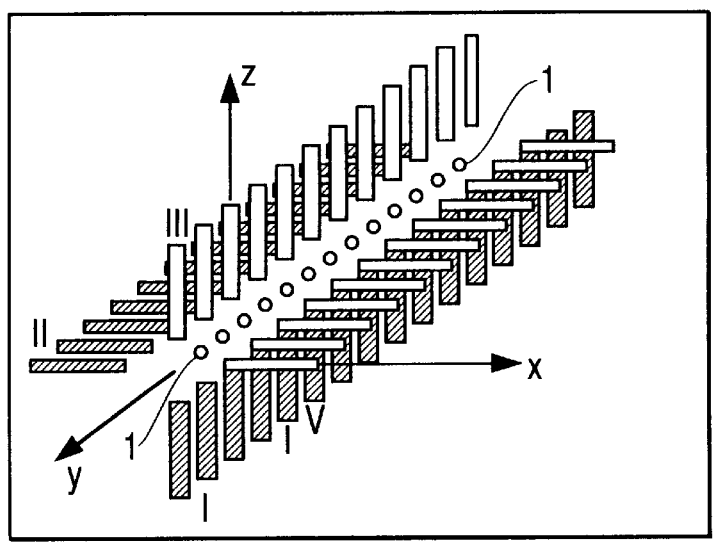
FIG. 7 illustrates a device for spatial focussing of particles.

In the device shown in FIG. 7 are a first pair of electrode rows II and IV and a second pair of electrode rows I and III are disposed perpendicular to each other in such a manner that they border a three-dimensional channel. The particles 1 in the free space of the fluid medium between the electrode rows I, II, III and IV can be collected and retained in this channel. The invented device is also suited for linear transport of particles.

Figure 8:
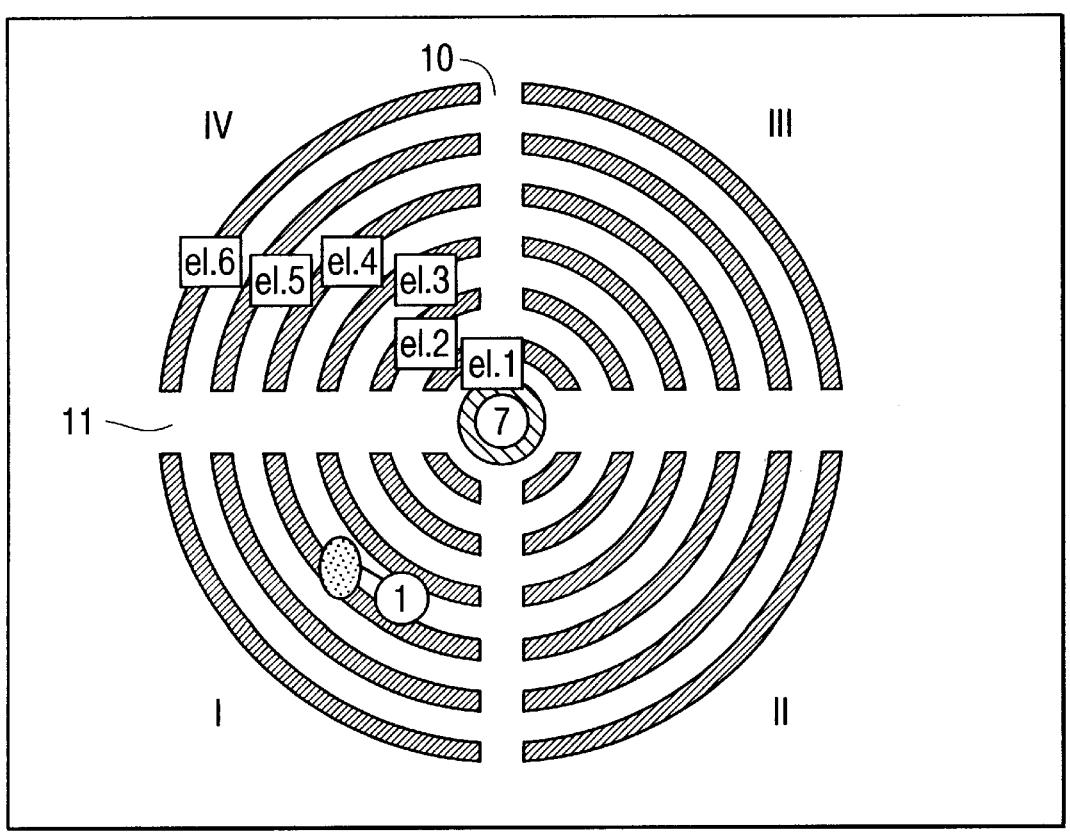
FIG. 8 illustrates a device for centering and decentering particles.

FIG. 8 shows an invented device for centering or decentering particles. The electrodes el.1 to el.6 are disposed circular-sector-like, concentric and evenly spaced about an operation space 7 in four quadrants I to IV in such a manner that they border two channels 10 and 11 perpendicular to each other. The particles 1 can be moved above the electrode surfaces or in the electrode free channels 10 and 11 depending on the traveling direction of the high frequency field into the operation space 7 or away from the operation space 7. With suited triggering, the particles can be transported from one quadrant over the operation space into any other quadrant or into one of the channels. This versatile micromanipulator is especially suited for work with living biological cells. For centering and decentering particles, the electrodes can be shaped as closed ring-shaped paths.

Figure 9:
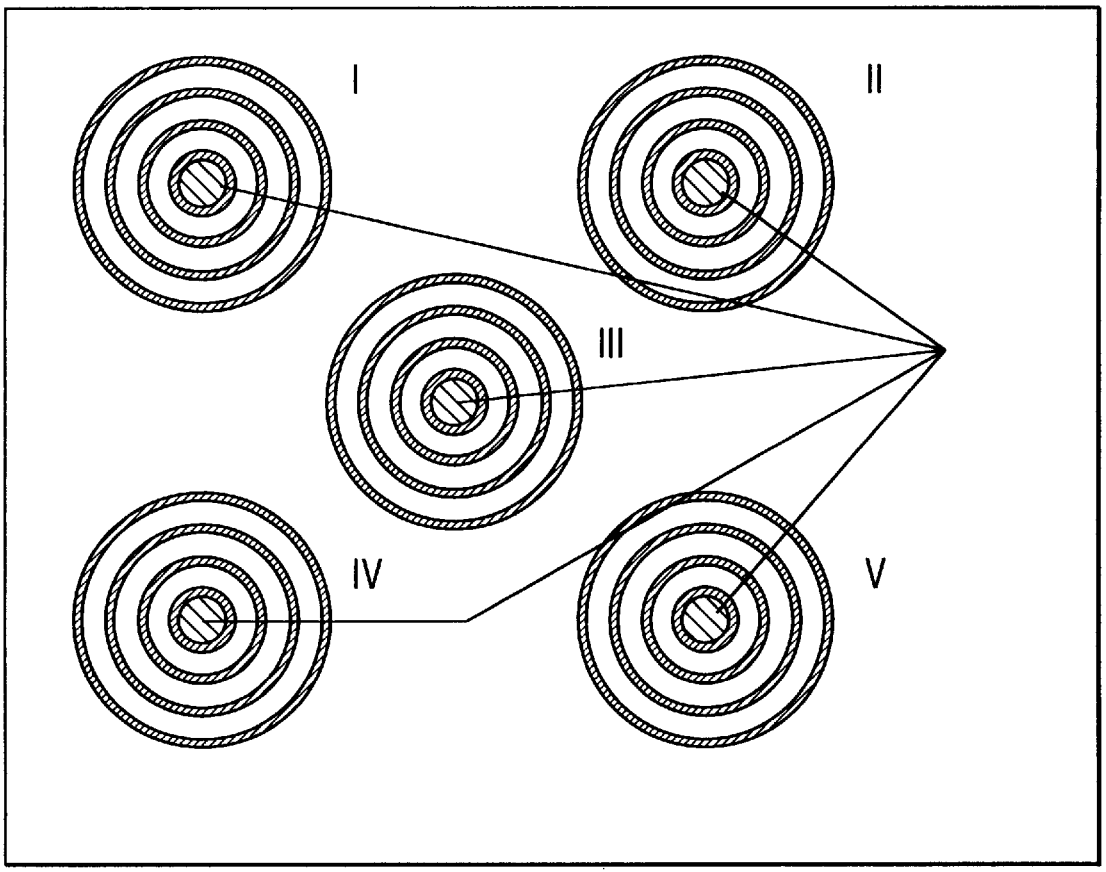
FIG. 9 illustrates a device which is designed as a semi-permeable membrane.

FIG. 9 shows an invented device in which many concentric, ring-shaped electrode systems are disposed on a thin membrane. In this figure only a detail of five systems I to IV is shown. The membrane is provided with through openings in the central regions of the systems. Small dielectric particles can only pass through these openings if they are conveyed by the traveling high-frequency fields in direction of the center. In this way, the invented device has the effect of a controllable, semipermeable membrane. All or only specific openings can be selectably switched to open or close.

Figure 10:
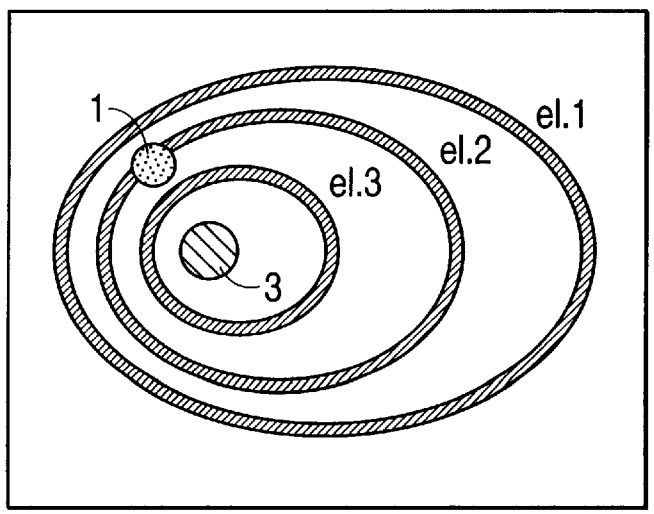
FIG. 10 illustrates a device with an elliptic arrangement of electrodes.

In the embodiment of the present invention shown in FIG. 10 the electrodes are formed as elliptic paths el.1 to el.3 which are arranged about a mutual focal point in such a manner that their large axes lie on a single straight line. Particles 1 are transported into the central region 3 or away from it by a traveling electric high-frequency field which is moving to or away from the mutual focal point.

The invented device can also be provided with four rectangular electrodes el. 1 to el.4 which are arranged in a star-shaped manner about a central region 3. In this device the electric field runs in a circular manner. The device serves to separate and focus particles. If a dispersion with two types of particles, by way of illustration, cellulose sulfate beads 12 and living yeast cells 13 in water having a conductivity of 50 to 100 $\mu$S/cm, are entered into the system and subjected to a circling field of approximately 2 megahertz, thus the cellulose sulfate beads 12 are collected in center 3 whereas the yeast cells 13 travel to the surfaces of the electrodes and adhere there.

Reduction of the dissipated power can only be achieved by miniaturization, including restriction of the created field to the small volumes where cell manipulation is required. This necessitates the use of micro- or ultra-microelectrodes with spacings on the same scale. The microstructure have been fabricated using photolithography (typical structurization >1 $\mu$m) or electronbeam lithography (structurization between 150 nm and 3 $\mu$m). As the interelectrode separation becomes very small, the driving voltages can be reduced to 1 V or less. In addition, the electrodes can be covered with a sub-$\mu$m layer of dielectric (e.g., $SiO_2$), so that power dissipation between the electrodes is much reduced, and cell electrode contact is prevented.

In contrast to electrochemical applications, a faradic current is not necessary. However, it cannot be completely avoided. The use of planar arrays of as many electrodes as possible allows the total power dissipation to be reduced. This is because the penetration depth of the electric field into the liquid decreases as the electrode pitch is made finer. Rigid adherence to these principles allows the production and exploitation of local fields up to $10^6$ V/m in standard media such as Dulbecco's Modified Eagle Medium (DMEM) or Murashige and Skoog medium, for animal or plant cells, respectively.

Figure 11A:
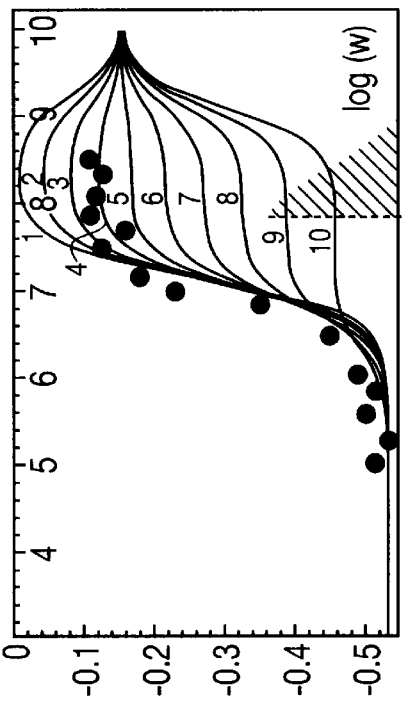
FIGS. 11a–f illustrate dielectrophoretic force and trans-membrane potential over log (w) in FIGS. a–d and power dissipation over a cross-section through a quadrupole field cage in FIGS. e and f, where w is the angular frequency $2\pi f$.
Figure 11B:
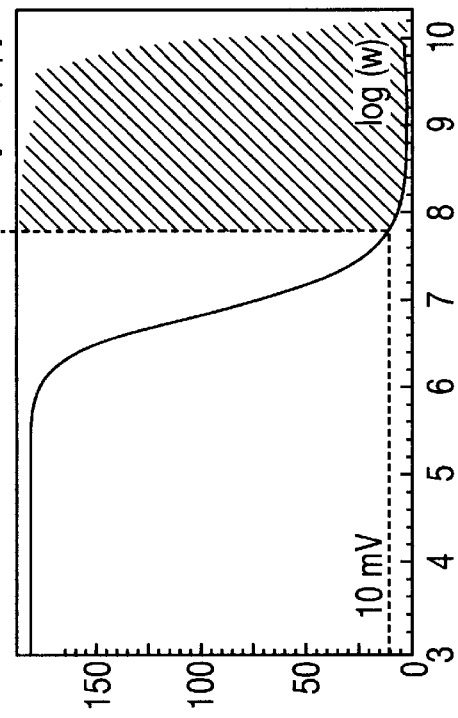
Figure 11C:
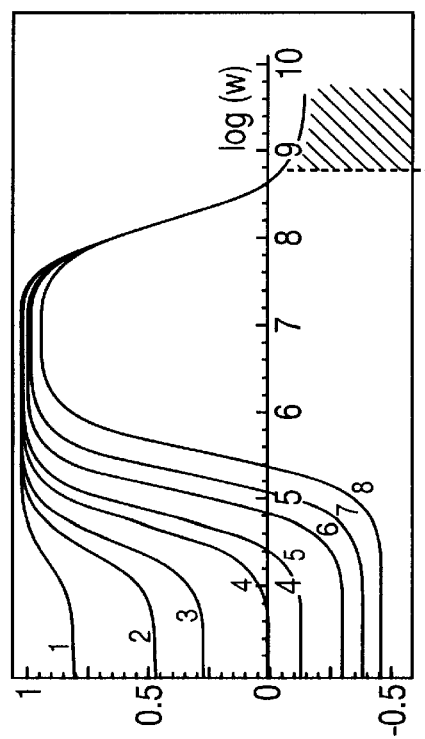

It is highly significant that living cells (from bacteria to animal cells and plant protoplasts) as well as most artificial particles show exclusively negative dielectrophoresis in these media. See FIG. 11c for this. This is because the medium conductivity (1 S/m or more) exceeds that of the cell interior, where the ionic mobility is low (e.g., due to the high viscosity).

Figure 11D:
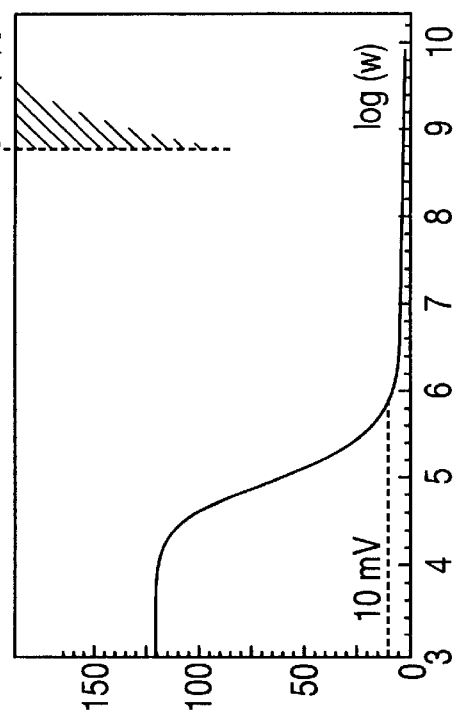
Figure 11F:
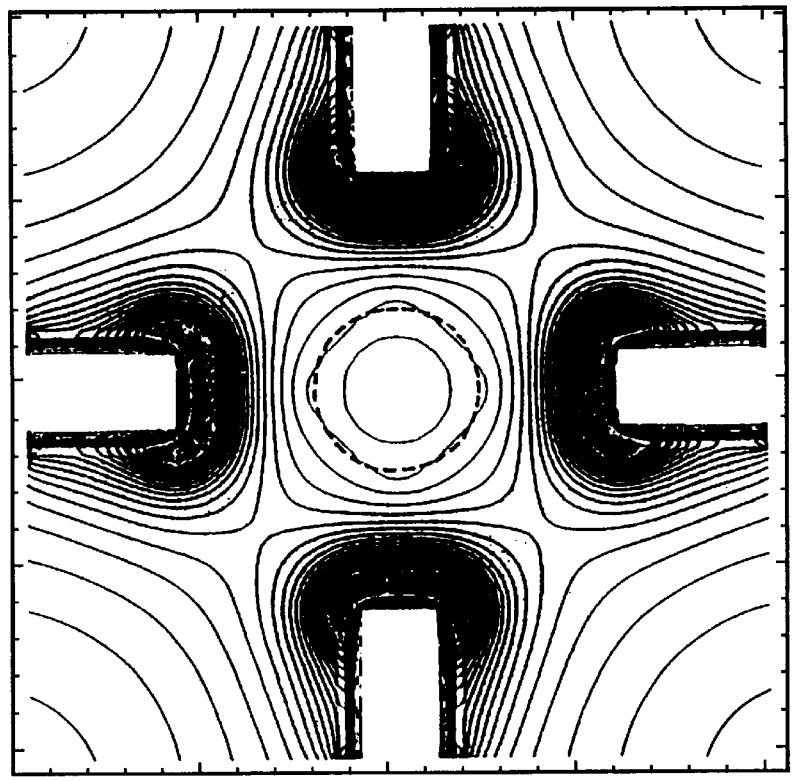

In media of low conductivity, the dielectric force (FIG. 11a) can be negative only at low frequencies where the induced transmembrane potential (FIG. 11b) is high. The force is also negative in the GHz range. Heat production (FIG. 11e) in the vicinity of the cell is markedly nonuniform. In contrast, in media of high conductivity, the force (FIG. 11c) is always negative and useful force can be obtained with the low induced transmembrane potential (FIG. 11d). Heat production (FIG. 11f), although 1000 times as great as in (FIG. 11e) is much more uniform near the cell.

Figure 11E:
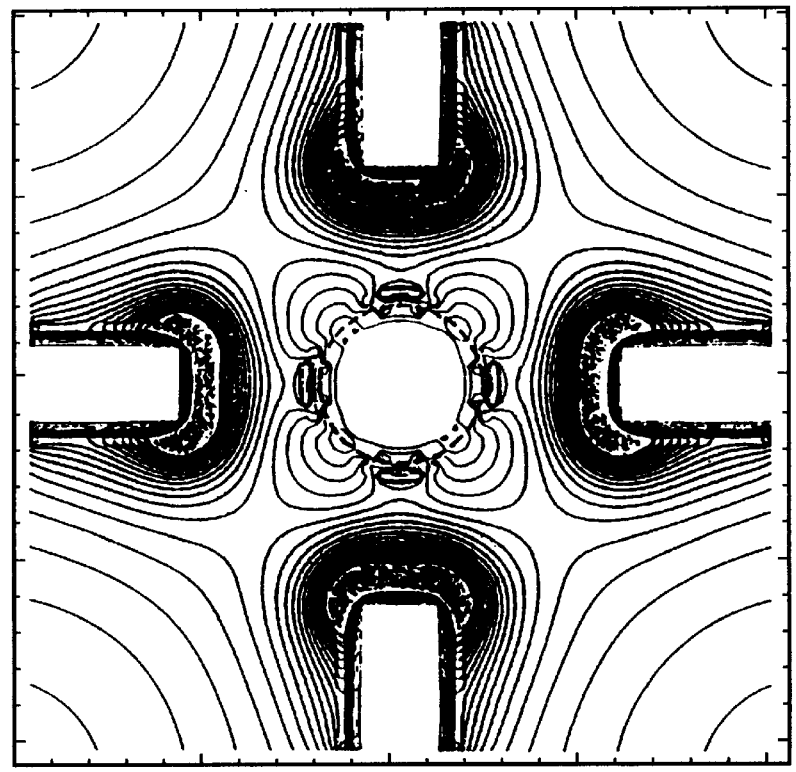

The local electric field in (FIGS. 11a–d) has a radian frequency of $10^3$ to $10^9$ and is 20 kV/m ptp (peak to peak). Curves 1–8 in (FIG. 11a) are for a cell having a cytosolic conductivity 0,6 S/m and media conductivities of 0.1, 0.3, 0.5, 1.0, 1.5, 3.0, 5.0 and 10 mS/m. In (FIG. 11c), the medium conductivity is 1.2 S/m and the curves 1–10 represent cytosolic conductivities of 1, 0.9, 0.8, 0.7, 0.6, 0.5, 0.4, 0.3, 0.2, and 0.1 S/m. Experimental data from 3T3 cells are also shown in this panel. All calculations assume a spherical cell of radius 6 µm with a single membrane 6 nm thick, conductivities $k_{CELL}$=0.6 S/m, $K_{membrane}$=1 µS/M, and relative permittivitie $\epsilon_{cell}$=60, $\epsilon_{membrane}$=8, and $\epsilon_{medium}$=80 (FIG. 11e, f). Power dissipation over a cross section through a quadruple field cage. These were calculated for the high-frequency region and for medium conductivities of (FIG. 11e) 1 mS/m and 8 (FIG. 11f) 1.38 S/m. Increasing levels of power dissipation are shown by increasing density of shading. Although the power dissipation at 1 mS/m is about 1000 times less than at 1.38 S/m, the distribution across the surface (dashed circle) of a cell within the trap is much less uniform.

It is possible to arrange narrow strip electrodes into very closely spaced arrays. See FIGS. 12a–f. The electric field spreads no further than a few interelectrode gaps from the array; particles or cells that enter this zone are repelled. They cannot enter the region of colloid-chemical surface forces and therefore cannot attach to the surface.

These force-field structures are particularly interesting for medical-technical problems and for the development of biocompatible surfaces. It is advantageous to use very small electrodes because the size of the particle that can be repelled is decreased, and because the field minima become so narrow that larger particles do not assemble there.

In FIGS. 12a–f effects of negative-dielectrophoretic force fields produced above arrays of individually addressable, interdigitated electrode fingers are shown. In FIGS. 12a–d an array of 32 electrodes (gold, 3 µm width) on a silicon substrate was used.

Figure 12A:
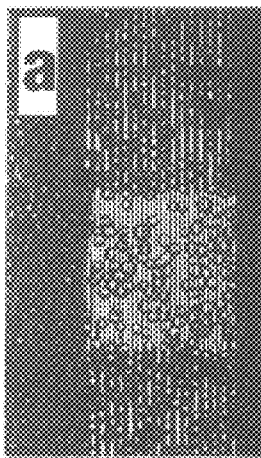
FIGS. 12a–f illustrate effects of negative-dielectrophoretic force fields produced above arrays of individually addressable, interdigitated electrode fingers.

FIG. 12a shows adhesion in the absence of a field, of 3T3 fibroblasts to the chip after 30 min.

Figure 12B:

FIG. 12b shows that the array, if energized (1.5 V square wave ptp, 1 MHz), remains free of fibroblast. The medium was DMEM.

Figure 12C:
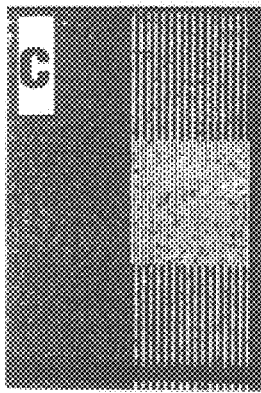

FIG. 12c gives evidence to the adherence of human erythrocytes to both substrate and electrodes in the absence of a field. The substrate had been pretreated with poly-D-lysine (0.1 g/l, MW 30–70 kDa). Erythrocytes were allowed to settle from a 1:10 dilution in PBS of a 50% hematocrit concentration.

Figure 12D:
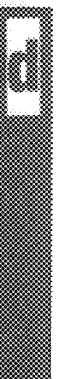

FIG. 12d shows that excitation (1 MHz, 1.5 V square wave ptp, medium conductivity 1.4 S/m) prevents settling of erythrocytes on the electrodes, in spite of dense settlement outside this area.

Figure 12E:
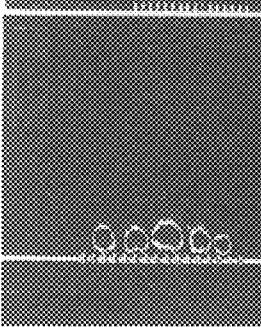

FIG. 12e shows a cross-sectional view of 9-µm Fluoresbrite $^R$ latex particles (blue) resting on an array of 16 gold electrodes (1 µm wide, 3 µm spacing); these are end-on to the observer and appear as white interruption to the silicon surface (yellow). The image is a 90°-perspective rotation using a confocal laserscan microscope (bar 35 µm).

Figure 12F:
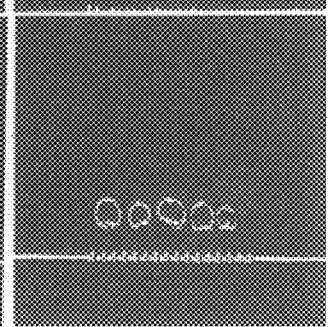

In FIG. 12f the latex particles from FIG. 12e are levitated about 10 µm upon excitation of the array (4 V ptp square wave, 1 MHz, conductivity 1.2 mS/m). A similar or a better levitation occurs at 1 S/m.

For a better explanation of the traveling-wave drive FIGS. 13a–d are shown. To apply a force to a cell alternating voltages are applied to the successive electrodes of an array with phase delays such that a traveling wave is formed. See FIG. 13a and compare the polarities at time $t_1$, and $t_2$.

Pulse lengths (repetition frequencies) that give rise to negative dielectrophoresis do so by giving the cell an effective polarization as shown for time t1, generating a levitation force ($F_L$). At time $t_2$, the electrode charges have been moved one place to the right, but the charges previously induced on the cell do not decay instantly, and the resulting force $F_R$ drives the cell in the opposite direction to the field.

Figure 13A:
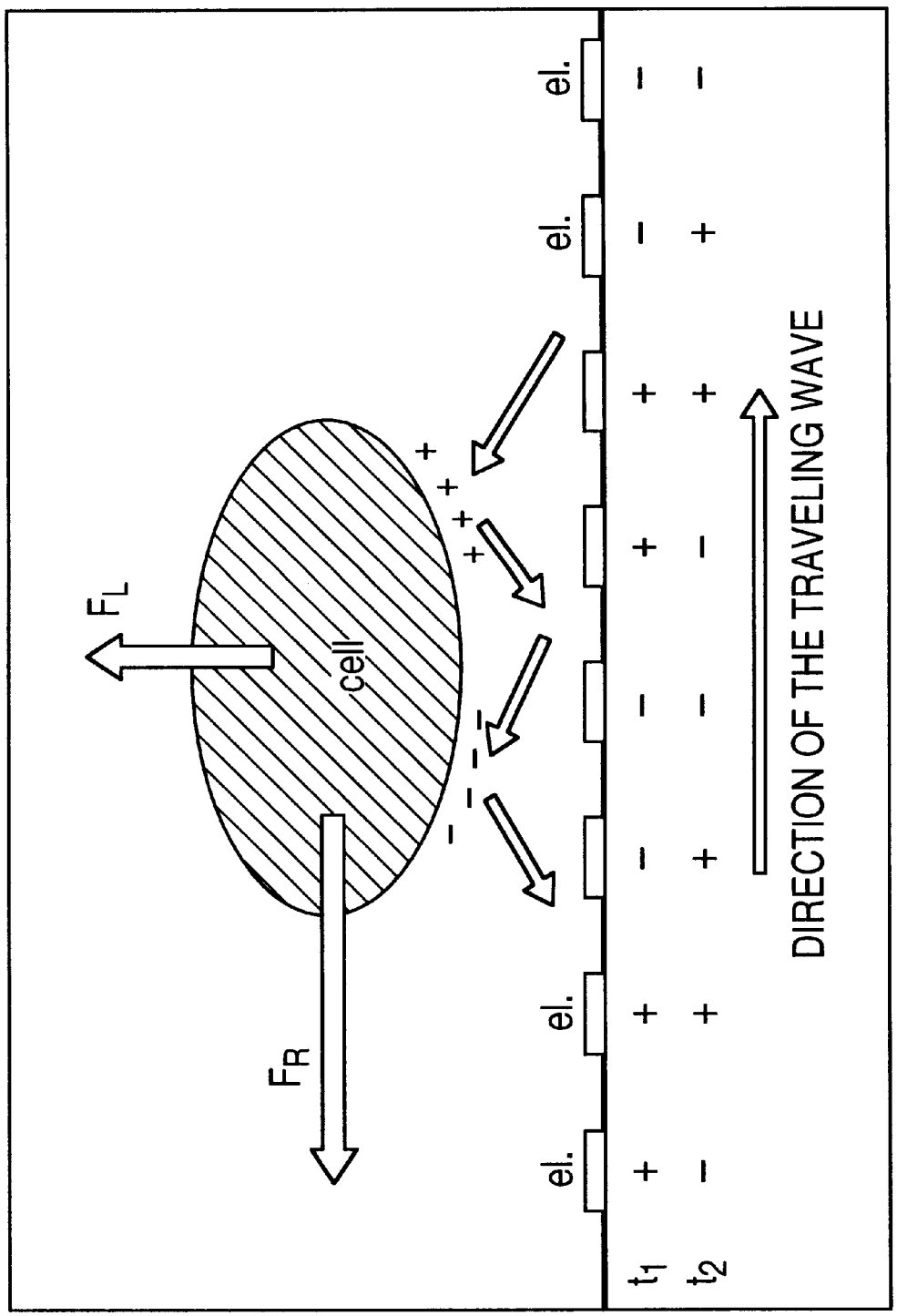
FIGS. 13a–d illustrates principles and practice of a traveling-wave drive.
Figure 13B:
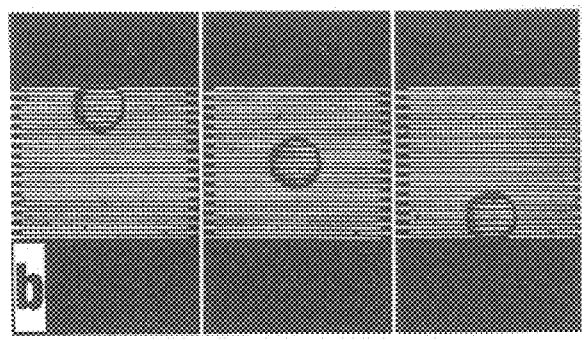
Figure 13C:
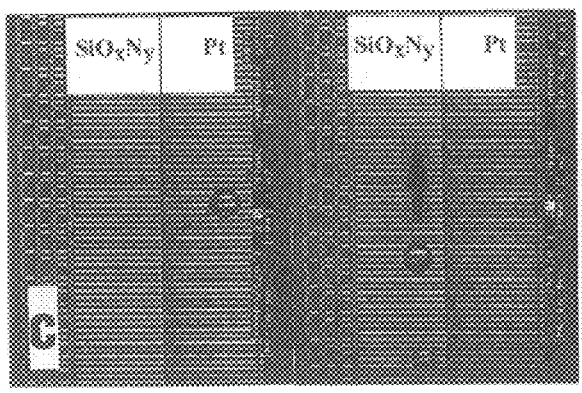

FIG. 13b shows time laps images of the movement of a 60-µm particle. FIG. 13c shows a traveling-wave array with 4-phase excitation, consisting of bare (Pt) or silicon oxynitride-coated ($SiO_xN_y$) platinum electrodes. Levitation and movement of 60-µm Sephadex particles are possible above both the bare electrodes (using 5 V at 200 kHz) as well as above the coated structure (using 6 V at 400 kHz). The coating is 0,7 µm thick, thin enough to allow sufficient capacitive coupling of the field into the medium (conductivity 1.07 S/m), although the particle speed is reduced by about 50%.

Figure 13D:
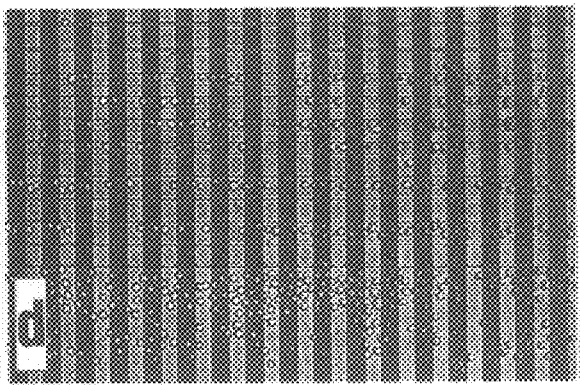

FIG. 13d shows an electrocellular marshalling yard consisting of silicon oxy-nitride tracks (the almost transparent strips running left to right) deposited at right angles to platinum electrodes (30 µm wide, the light colored vertical strips). On excitation of the electrodes (1.5 V ptp square wave, 4 MHz), particles showing negative dielectrophoresis (here, fibroblasts suspended in culture medium) move to the field minima above the insulator tracks. Where the track width is comparable to the cell diameter, a single file along the tracks results: where the track width is much larger than the cell diameter, cells orient themselves parallel to the electrodes. This is apparent at the bottom of the picture over a single, very wide (200 µm) track. The cells can be moved along the tracks by means of a gentle current in the medium, or by application of a traveling wave to the electrodes.

FIGS. 13a–d show that linear arrays of electrodes with widths <15 µm can be driven with traveling waves to move most particles and cells through microchannels. Although the electrode array can be as long as necessary, the connections are repeated every third or fourth electrode, so that only three or four driving voltages are required.

Under conditions of negative dielectrophoresis, the array also acts as a force-field structure and the cells float above it. Planar tracks having a low-permittivity dielectric deposited perpendicular to the electrode strips cause troughs in the field, confining cells to the paths thus defined. See for example FIG. 13d. The maximum size of cells that can be transported is approximately equal to the track width. Due to the ease with which high frequencies can be capacitively coupled, the whole area can be covered with a thin dielectric layer FIG. 6A, the structuring of which leaves the tracks as moraines troughs or waves $T_S$, $T_R$. The minimum size of transportable particles is about half the repeat distance of the electrodes in this case.

Depending upon the type of particle and the strength of the applied field, speeds from one up to several hundred µm/s can be attained. However, in conductive solutions (>1 S/m), the maximum speed is about ten times less than at 10 mS/m; it is likely that this can be improved upon by use of electrode arrays on both sides of the channel, or by increasing the permittivity of the medium.

Figure 14:
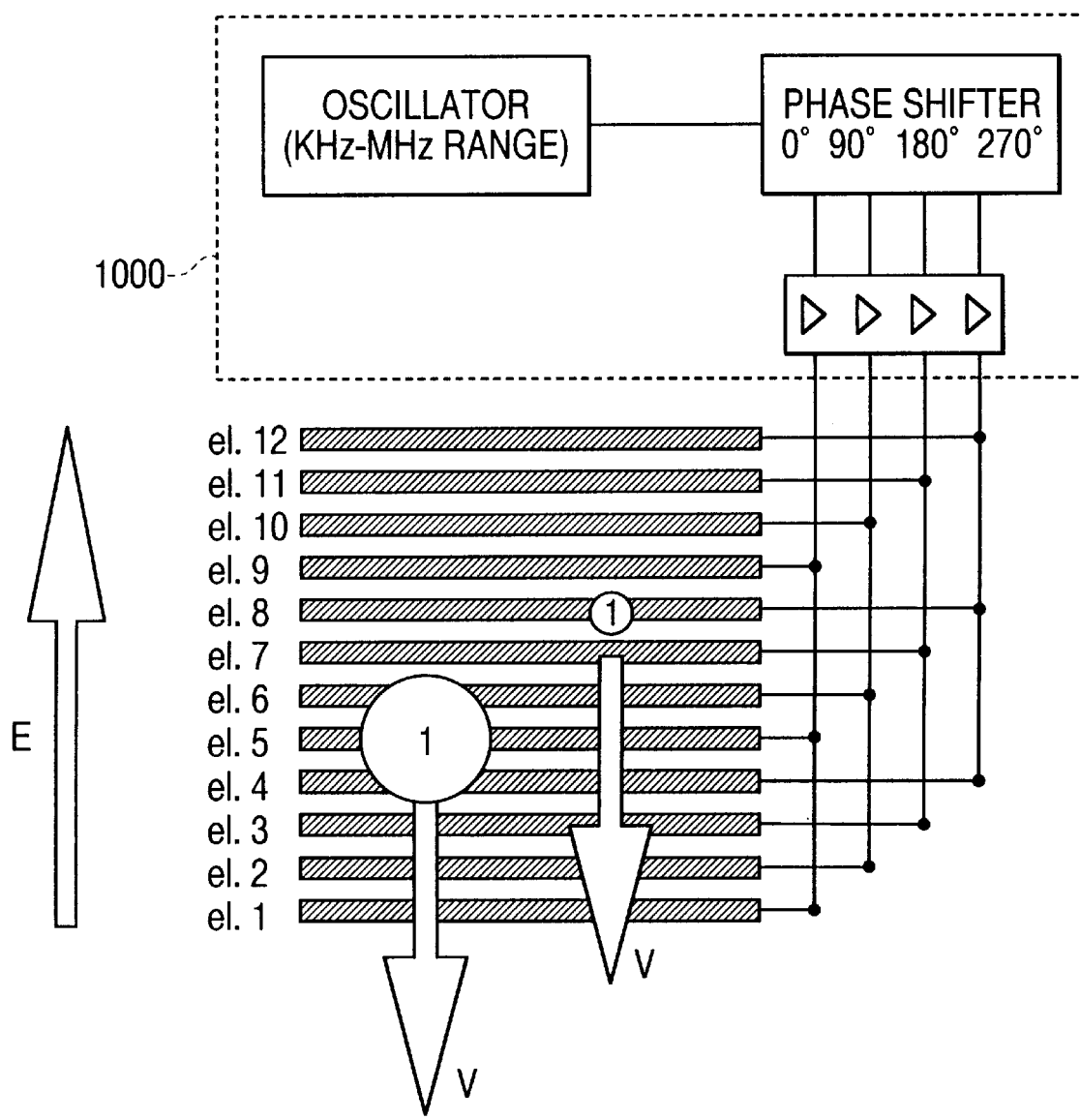
FIG. 14 illustrates an electronic circuit which applies a voltage to electrodes successively in such a manner that a high frequency electric field is built up.
Figure 15:
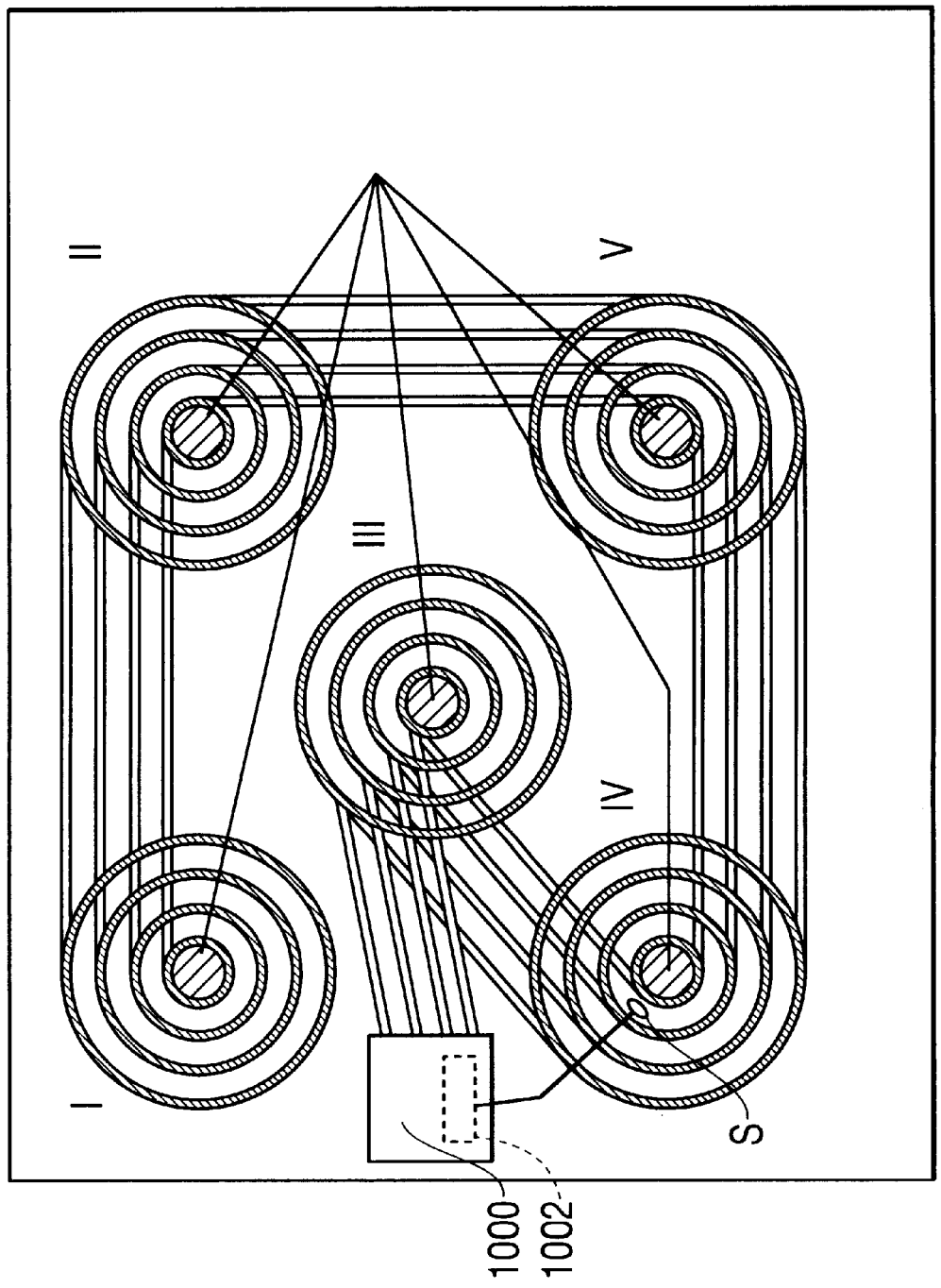
FIG. 15 illustrates an electronic circuit which applies a voltage to circular electrodes successively in such a manner that a high frequency electric field running in a circular manner is built up.
Figure 16:
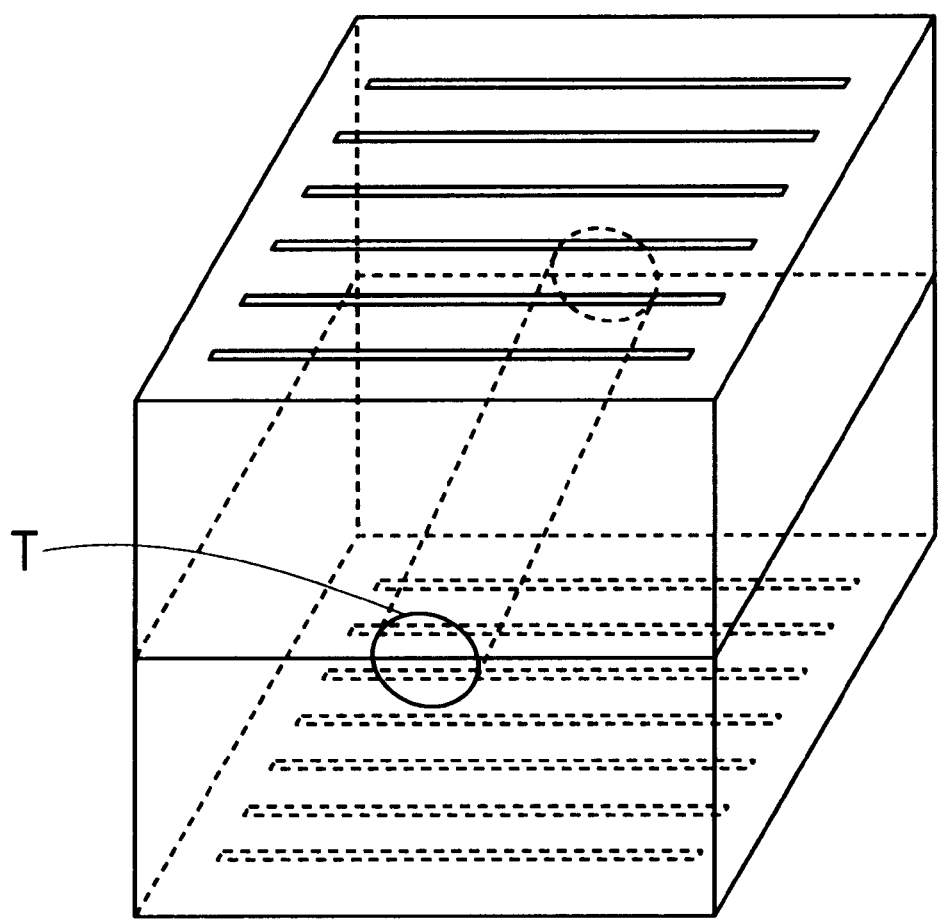
FIG. 16 illustrates a capsule embodiment having a trough therein.
Figure 17:
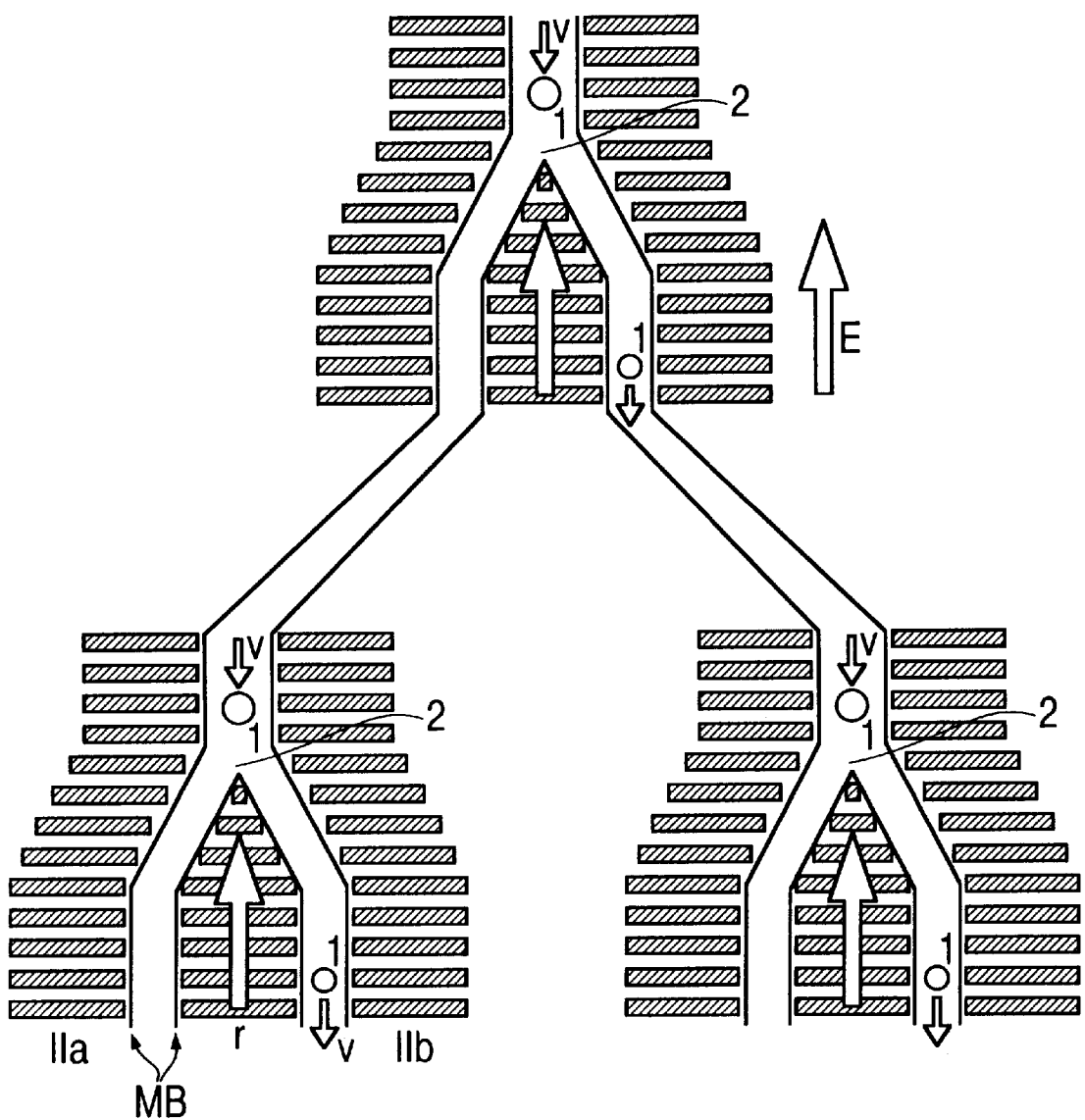
FIG. 17 illustrates an interconnected or cascaded embodiment.

FIG. 14 illustrates an electronic circuit 1000 which applies a voltage to electrodes successively in such a manner that a high frequency electric field is built up. FIG. 15 illustrates an electronic circuit 1000 which applies a voltage to circular electrodes successively in such a manner that a high frequency electric field running in a circular manner is built up.

The electronic circuit 1000 can be of an integrated construction, and is either a high-frequency generator in the frequency range between 1 kHz and 1 GHz together with a circuit which splits the phases containing an output amplifer with an amplitude between 0.1 to 40 V or only the output amplifer stage for the operation of the electrodes. The used travelling-wave principal needs phase-shifted signals according to the number of electrodes which shall produce the travelling waves. If the electrodes are arranged in rings, this corresponds to an even number of electrodes. This means that four electodes need four rectangular or sinuous or otherwise formed pulses which are phase-shifted from each other by 90°. Eight electrodes would need eight signals which are shifted by 45°, and so on. By use of a linear arrangement of electrodes, the number of phase-shifted signals sets the number of electodes which are used for production of a travelling wave or how many travelling waves run over one electrode surface at the same time. Such electronic circuit can likewise perform the additional function of evaluating movement of the particles through the multi-electrode system, using a sub circuit 1002 and sensor S as shown in FIG. 15.

The minimum number of electrodes needed is three. As a maximum, any number of electrodes can be used.

The electronic circuit can be realized in digital technology, for example to produce rectangular pulses, or in analog technology for example to produce sinuous pulse voltages. Such circuit can be namufactured in CMOS technology as an IC, or as a hybrid chip. Because of the high frequency, it is desireable to place the output amplifer near the electrodes.

Attention is directed to the Fuhr et al. article, "Radio-Frequency Microtools for Particle and Live Cell Manipulation", Naturwissenschaften 81, pp. 528–535 (1994), and many of the teachings and contents thereof which have been incorporated into the present disclosure.

We claim:

1. A process for manipulation of microscopic, dielectric particles, said process comprising the steps of:
    exposing said particles to an electric field,
    suspending said particles in one of a fluid and a gel,
    operating said electric field to effect one or several high-frequency fields with frequencies between 0.1 MHz and 1 GHz traveling in prescribed directions, such that a traveling velocity of said high-frequency fields induces interfacial charges in said particles, which charges remain behind a traveling field vector to cause movement of said particles.

2. A process as claimed in claim 1, wherein said particles are conducted electrically by means of field inhomogeneities.

3. A process as claimed in claim 1, wherein said particles are conducted by means of mechanical boundaries.

4. A process as claimed in any one of claims 1 to 3, wherein a traveling frequency of said high-frequency fields is in a range between 0.1 and 100 Mhz and an amplitude of a voltage applied is between $10^{-2}$ and 100 volts.

5. A device for carrying out manipulation of microscopic, dielectric particles, said device comprising:
    a base on which a multi-electrode system is disposed, surfaces of said electrodes coated with a coating of insulating materials having a rough or smooth structure, with said coating being provided with troughs, waves and regions of varying strength;
    an electronic circuit for successive application of predetermined electric voltages to all said electrodes to generate a high-frequency electric field with a traveling direction in said base; and
    wherein electrodes of said multi-electrode system are arranged side by side approximately perpendicular to said a travelling direction of said high-frequency electric field, with both a distance of said electrodes from each other and a linear expansion of said electrodes in said traveling direction approximately corresponding in magnitude to said particles to be manipulated.

6. A device for carrying out manipulation of microscopic, dielectric particles, said device comprising:
    a base on which a multi-electrode system is disposed, surfaces of said electrodes coated with a coating of insulating materials having a rough or smooth structure, with said coating being provided with troughs, waves and regions of varying strength;
    an electronic circuit for successive application of predetermined electric voltages to all said electrodes to generate a high-frequency electric field with a traveling direction in said base; and
    wherein electrodes of said multi-electrode system are arranged side by side approximately perpendicular to said a travelling direction of said high-frequency electric field, with both a distance of said electrodes from each other and a linear expansion of said electrodes in said traveling direction approximately corresponding in magnitude to said particles to be manipulated;
    wherein said multi-electrode system is provided with a branching arrangement to effect a branching manipulation of said microscopic, dielectric particles.

7. A device as claimed in claim 5, wherein said electrodes have an elongated rectangular shape and are arranged evenly spaced parallel to each other in such a manner that said traveling direction runs perpendicular to longitudinal axes of said electrodes.

8. A device as claimed in any one of claims 6 or 7, wherein said electrodes, starting with an electrode within a central region of said multi-electrode system are interrupted in a region and in such a manner so as to provide an interrupted V-shaped region widening in a V-shaped manner in said traveling direction, with said electrodes being bent in a vicinity of said interruption in such a manner that said electrodes enter said V-shaped region vertically.

9. A device as claimed in claim 7, wherein two rows of electrodes are arranged in such a manner that said electrodes of both said rows lie opposite each other and such that between said rows an electrode-free channel is created along said traveling direction of said high-frequency electric field.

10. A device as claimed in claim 9, wherein electrodes of said rows are arranged in such a manner that a width of said electrode-free channel increases from a constant value to a value many times that of said constant value, and said device further comprising, in a region of a wide channel, an additional row of electrodes of increasing electrode width disposed in such a manner that a channel branching arrangement is formed, and at least one directing electrode arranged within said electrode-free channel and at a branching point of said electrode-free channel.

11. A device as claimed in claim 9, wherein two pairs of electrode rows are arranged perpendicular to each other in such a manner so as to enclose a three-dimensional channel along said traveling direction of said high-frequency electric field.

12. A device as claimed in claim 5, wherein said electrodes are formed as circular, ring electrodes which are arranged concentrically and evenly spaced.

13. A device as claimed in claim 12, wherein said electrodes are formed as sectors of ring circles and enclose electrode-free channels.

14. A device at claimed in claim 5, further comprising multiple electrode systems arranged on said base, with said base consisting of a thin membrane which is provided with through-openings whose permeability for particles can be altered with an aid of said high-frequency fields.

15. A device as claimed in claim 5, wherein said electrodes are formed as elliptic electrodes which are provided with a mutual focal point and large axes of which lie on a single straight line.

16. A device as claimed in claim 5, wherein regions between said electrodes and said channels being partially provided with depressions or elevations and regions of varying surface roughness.

17. A device as claimed in claim 5, wherein said base is composed of one of a semiconducting material, glass and ceramic, wherein partial depressions or elevations are generated in said base by means of etching processes, wherein said electrodes are composed of one of gold and a chemical inert material, are structured by means of photolithographic methods, and are galvanically molded, and wherein dielectric layers on said electrodes are composed of one of $SiO_2$, $Si_3N_4$ and $TiO_2$.

18. A device as claimed in claim 5, wherein said electronic circuit for generation of said high-frequency electric field, is further for evaluation of movement of said particles, and is integrated in conjunction with said multi-electrode system on a mutual base.

19. A device as claimed in claim 5, wherein in order to seal said device in a capsule, a cover plate of one of a semiconducting material, ceramic and glass is provided which is connected to said base and which can also be provided with said electrodes and/or troughs and channels.

20. A device as claimed in claim 5, wherein several bases are joined in such a manner such that a predetermined arrangement comprising at least one of cascades, spaces and channels is created in which said particles can be stored, separated, concentrated or transported.

* * * * *